US008650111B2

(12) United States Patent (10) Patent No.: US 8,650,111 B2
Harrington (45) Date of Patent: Feb. 11, 2014

(54) METHOD AND SYSTEM FOR TRACKING DERIVATIVES POSITIONS AND MONITORING CREDIT LIMITS

(71) Applicant: Tradeweb Markets, LLC, New York, NY (US)

(72) Inventor: George Harrington, Atlantic Highlands, NJ (US)

(73) Assignee: Tradeweb Markets LLC, Jersey City, NJ (US)

( * ) Notice: Subject to any disclaimer, the term of this patent is extended or adjusted under 35 U.S.C. 154(b) by 0 days.

(21) Appl. No.: 13/657,962

(22) Filed: Oct. 23, 2012

(65) Prior Publication Data

US 2013/0046676 A1 Feb. 21, 2013

Related U.S. Application Data

(63) Continuation of application No. 12/624,068, filed on Nov. 23, 2009, now Pat. No. 8,315,935, which is a continuation of application No. 11/302,026, filed on Dec. 12, 2005, now abandoned.

(60) Provisional application No. 60/635,420, filed on Dec. 10, 2004.

(51) Int. Cl.
    *G06Q 40/00* (2012.01)
(52) U.S. Cl.
    USPC ............... 705/36 R; 705/38; 705/35; 705/37
(58) Field of Classification Search
    USPC ............... 705/35, 36 R, 37, 38, 26.1, 1.1; 235/379, 380
    See application file for complete search history.

(56) References Cited

U.S. PATENT DOCUMENTS

| | | | |
|---|---|---|---|
| 6,317,727 B1 * | 11/2001 | May | 705/36 R |
| 6,347,307 B1 * | 2/2002 | Sandhu et al. | 705/36 R |
| 6,418,417 B1 * | 7/2002 | Corby et al. | 705/36 R |
| 6,421,653 B1 * | 7/2002 | May | 705/36 R |
| 7,225,153 B2 * | 5/2007 | Lange | 705/37 |
| 2001/0042041 A1 * | 11/2001 | Moshal et al. | 705/37 |
| 2002/0023045 A1 * | 2/2002 | Feilbogen et al. | 705/37 |
| 2003/0088509 A1 * | 5/2003 | Wilton et al. | 705/37 |

(Continued)

OTHER PUBLICATIONS

McDonough, William "The Global Derivatives Market" Autumn 1993, FRBNY Quarterly Review, 1-4.*

(Continued)

*Primary Examiner* — Kelly Campen
(74) *Attorney, Agent, or Firm* — Stroock & Stroock & Lavan LLP (57) ABSTRACT

A derivatives position tracking system that consists of a centralized trading engine with a trade history database capable of communication with a plurality of counterpart computers via a network to enable the execution of a derivatives transaction. The trading engine and counterpart computers enable the counterpart computers to initiate, unwind and assign requests. Upon execution of a tear-up or assignment, a record of such transaction is stored in the trade history database. Whether or not the tear-up or assignment is executed with the original counterpart, the original counterpart receives a notification of the tear-up/assignment and a new position with the counterpart is reflected in the position-tracking database. Additionally, a credit monitoring module can be used in connection with the derivatives position tracking system to enable the trading engine to alert counterparts when a derivatives transaction exceeds a pre-defined credit limit.

20 Claims, 8 Drawing Sheets

(56) References Cited

U.S. PATENT DOCUMENTS

| | | | |
|---|---|---|---|
| 2003/0115128 A1* | 6/2003 | Lange et al. | 705/37 |
| 2003/0115131 A1* | 6/2003 | Heaton et al. | 705/37 |
| 2003/0149646 A1* | 8/2003 | Chen et al. | 705/35 |
| 2005/0234795 A1* | 10/2005 | Hodes et al. | 705/36 |

OTHER PUBLICATIONS

Mengle, David "Regulatory Solutions to Payment System Risks: Lessons From Privately Negotiated Derivatives" 1995, Journal of Financial Services Research 9:381-391.*

* cited by examiner

FIG.1

| USDEMO | | SWAPTracker | | | |
|---|---|---|---|---|---|
| Sort ▼ | Indices ▼ Maturities All ▼ | | Positions All ▼ | | |
| Description | Counterparty | Dlr Number | L/S | Notional (000) | Price/Yld |
| CDX NA IG 0909 – NET POSITON+100,000 | | | | | |
| | DLRY | 445566 | L | 100,000 | 63.00 |
| CDX NA ENERGY 0909 – NET POSITON – 50,000 | | | | | |
| | DLRY | DF77W5 | S | 50,000 | 48.25 |
| ITRAXX EUROPE 0309 – NET POSITION – 1,000 | | | | | |
| | DLRW | TY778994 | S | 1,000 | 59.50 |
| ITRAXX HIGH VOL 0309 – NET POSITION + 25,000 | | | | | |
| | DLRZ | FT44177 | L | 25,000 | 45.23 |
| ITRAXX CROSS OVER 0914 – NET POSITION + 50,000 | | | | | |
| | DLRW | 954321 | L | 50,000 | 62.50 |
| CDX NA FINANCE 0914 – NET POSITION + 100,000 | | | | | |
| | DLRY | 446622 | L | 100,000 | 118.00 |
| CDX NA INDUSTRIAL 0914 – NET POSITION + 200,000 | | | | | |
| | DLRX | HI88765 | L | 200,000 | 118.00 |
| *Estimated unwind value based on previous nights close | | | | | Page 1 of 1 |
| < > | MAIN | TRSY | AGCY | MBS | EUGV | CP | ADN |

FIG.2A

| Inception Rate | EST unwind (000)* | Maturity | Unwind? | Roll? |
|---|---|---|---|---|
| 69.25 | (556) | 9/20/2009 | EXE | |
| 52.25 | (473) | 9/20/2009 | EXE | |
| 61.45 | (24.00) | 3/20/2009 | EXE | |
| 43.25 | 142.00 | 3/20/2009 | EXE | |
| 65.00 | (149.00) | 9/20/2014 | EXE | |
| 122.00 | (621.00) | 9/20/2014 | EXE | |
| 122.00 | (1,398.00) | 9/20/2014 | EXE | |

G/L [All ▼]   AXE it

Page 1 of 1

[CORP] [TKT] [BLOT] [BOOK] [MSG]   [Pg Up | Pg Dn]
                                    [ << | >> ]

| USDEMO | | AXE it |
|---|---|---|
| YOU BUY PROTECTION ON DJ CDX NORTH AMERICAN IG 5Y SEP 2009 60 BPS | | CDXNAIG-125S2 |

YOU BUY PROTECTION

| | | | RED CODE: | FLIP BUY/SELL (WRITE) |
|---|---|---|---|---|
| Instrument | CDXNAIG-125S2 | | | |
| Current Quota | 64.00-65.25 | | DLRA | DLRE |
| Notional (000) | 5,000 | | DLRB | DLRF |
| Rate | 65.25 | | DLRC | DLRG |
| Settlement Data | 7/14/2004 | | DLRD | DLRX |
| Maturity Data | 9/20/2009 | | DLRY | DLRZ |
| | | | DLRW | |

Request Offer ▶    BUY
Assignment ▶
Counterparty: DLRA ▶
Confirm Number: 55411789

| Payment Period | Quarterly |
|---|---|
| Day Count | Act/360 |
| Payments | 127,500 |
| Accrued Payment | 66,583 |
| Est Present Value of Deal | (219,045) |
| Est Trade Value | (152,462) |

Account ▶   #Accts
Dealer Note ▶
Add to

| Chart |
|---|
| CDS Calculator |
| Security Description |

< > MAIN TRSY AGCY MBS EUGV CP ADN CORP TKT BLOT BOOK
SEND CANCEL   ID ▶ PIN   MSG

FIG.3

CDS Index Trade

| Trd #5 | DLR's-4 | Acct # 56 |

RFQ Sell Protection (Asign) — NEW ASSIGNMENT (405)

JOE SMITH –TW Investments — TRADE WILL FACE COUNTERPART A (410)

415

YOU OFFER PROTECTION

| | | CDXNAIG-125S2 |
|---|---|---|
| Notional | 100,000,000 | Matures Sep 15 2009 |
| Trade Date | 7/8/2004 | Current Mkt 64.00 / 65.25 |
| Settlement Date | 7/9/2004 | |
| Accrued Payment | -66,583 | |
| Est PV of Deal | 219,045 | |
| EST TRADE VALUE | 152,462 | |

Premium: [ 65.25 ]

| LEVEL GOOD FOR: | 0:10 | + | − | | − | + | |
|---|---|---|---|---|---|---|---|
| | | | | | | CALC VALUE | |

SEND/PASS

Cust Msg:
My Msg:

| Customer History: | Today | YTD |
|---|---|---|
| Request Bids | 3 | 45 |
| Request Offers | 2 | 27 |

Net Notional (000)   25,477

USDEMO — Credit Alert — AXE it

| ACCOUNT | NUMBER | OUTSTANDING PRINCIPAL (000) | NUMBER OF POSITIONS | CREDIT LIMIT (000) | REMAINING LIMIT | OVER? | CONTACT DESK | DISALLOW TRADE |
|---|---|---|---|---|---|---|---|---|
| CUST A | 123 | 15,000,400 | 14 | 20,000,000 | 4,999,600 | N | Y | N |
| CUST B | 4585 | 451,000 | 32 | 500,000 | 49,000 | N | Y | N |
| CUST C | 4511 | 5,000 | 1 | 10,000 | 5,000 | N | Y | N |
| CUST D | 2257 | 95,447 | 5 | 90,000 | (5,477) | | Y | N |
| CUST E | 4561 | 200,144 | 14 | 250,000 | 49,856 | N | Y | N |
| CUST F | 9988 | 15,400 | 3 | 20,000 | 4,600 | N | Y | N |
| CUST G | 3941 | 45,000 | 5 | 50,000 | 5,000 | N | Y | N |
| CUST H | 8874 | 96,540 | 12 | 100,000 | 3,460 | N | Y | N |
| CUST I | 5114 | 100,233 | 8 | 100,000 | (233) | N | Y | N |
| CUST J | 9959 | 65,000 | 7 | 10,000 | (55,000) | | Y | N |

[<] [>] [MAIN] [TRSY] [AGCY] [MBS] [EUGV] [CP] [ADN] [CORP] [TKT] [BLOT] [BOOK] [MSG]  C  >>

FIG.7

METHOD AND SYSTEM FOR TRACKING DERIVATIVES POSITIONS AND MONITORING CREDIT LIMITS

CROSS-REFERENCE TO RELATED APPLICATION

This application is a continuation of pending U.S. application Ser. No. 12/624,068, filed Nov. 23, 2009, which is a continuation of U.S. application Ser. No. 11/302,026, filed Dec. 12, 2005, which claims priority from U.S. provisional application Ser. No. 60/635,420 Dec. 10, 2004, the entire disclosure of each of which is expressly incorporated by reference herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention relates generally to the field of electronic trading systems and, more particularly, a system and method for tracking SWAP derivatives transaction positions and monitoring.

2. Description of the Related Art

A derivative is a financial contract whose value is based on, or "derived" from, a traditional security (such as a stock or bond), an asset (such as a commodity), or a market index. A SWAP agreement is a type of derivative transaction where two streams of cash flows are exchanged. SWAP's are inherently synthetic securities—they are created and/or terminated at the behest of the counterparties involved in the transaction. These transactions have stated durations for which they can ultimately last, but they can be cancelled at anytime upon mutual agreement by the counterparties. These cancellations can happen in a tear-up, where the original counterparties agree to end the contract for some economic terms. The transactions can also be exited by the one counterparty as part of an assignment. An assignment is a mutual agreement among the original counterparties to allow one original counterparty to exit the transaction while assigning another new counterparty its obligation. Two major markets for derivatives are interest rate swaps and credit default swaps, although others exist.

Derivatives transactions have traditionally been executed over the telephone through conversations between traders for the respective counterparts. More recently, electronic messaging systems and electronic trading systems have been developed to facilitate the execution of derivatives transactions. In addition, there has been a significant increase in the number and volume of SWAP transactions over the past few years. Because of such increase in trading volume and the fact that SWAP transactions may occur in different venues (e.g., over the phone or on an electronic trading platform), it has become increasingly difficult for market counterparties (e.g., customers and dealers) to monitor outstanding SWAP transactions, including tear-ups and assignments.

Indeed one of the most common problems with respect to monitoring SWAP transactions relates to tear-up/assignment situations. In the dealer-to-customer market when an outstanding SWAP is assigned by a customer to another dealer or offered back to the dealer that is the counterparty to the SWAPs transaction, the counterparts may be unaware at the time of execution and for several days, sometimes weeks after such execution, that the parties' respective positions have been unwound or assigned. For example, if Customer A terminates its position with Dealer A by assigning the derivative contract to Dealer B, it may take several days for Dealer A to become aware that it no longer has a position with Customer A. If Customer A tries to enter into a new derivatives transaction with Dealer A during the period of time after the assignment is effected by Customer A with the new dealer but prior to the time Dealer A is notified of the assignment, Dealer A may deny the transaction (for credit reasons, for example) based on a position that no longer exists. Customer A may seek to complete the new deal with another dealer, and Dealer A would have lost the opportunity to do the deal and potentially earn additional income.

Another common problem with respect to monitoring SWAP transactions relates to monitoring credit levels with customers. Parties trading derivatives transactions generally set credit levels with one another based on the parties' credit worthiness and current positions with one another. The lack of a system for updating positions substantially on a real-time basis also has implications for the administration and monitoring the parties' credit positions. For example, a dealer may execute several derivatives trades with a customer throughout the trading day. Because different traders at different times may execute the trades, a dealer is prone to making errors in determining whether the customer has reached its credit limit. On the one hand, if a dealer mistakenly permits a customer to trade over its credit limit, the dealer will be increasing its exposure significantly. On the other hand, if a dealer mistakenly believes that a customer has reached its credit limit because it is unaware that some transactions have been unwound or assigned away, the dealer may lose the opportunity to trade with the customer and potentially earn additional income.

As such, there is a long felt, but unresolved in the art for a system and method that both facilitates the unwinding and assignment of derivatives positions, but also allows counterparts to monitor such positions substantially in real time. Moreover, there is a need for a system and method that permits counterparts to monitor its credit position with customers in real time.

SUMMARY OF THE EMBODIMENTS OF THE INVENTION

The various embodiments of the present invention satisfy the foregoing, as well as, other needs. A derivatives position tracking system generally comprises a centralized trading engine including a trade history database capable of communication with a plurality of counterpart computers via a network to enable the execution of a derivatives transaction. The trade history database stores a record for each of the derivatives transactions executed on the trading engine. The trading engine and counterpart computers further enable the counterpart computers to initiate unwind and assignment requests. For example, a request for a tear-up may be submitted to the original counterpart, along with requests made to new counterparties for an assignment of the derivatives transaction. Upon execution of a tear-up or assignment, a record of such transaction is stored in the trade history database. Whether or not the tear-up or assignment is executed with the original counterpart, the original counterpart receives a notification of the tear-up/assignment and a new position with the counterpart is reflected in the position-tracking database.

A position tracking method generally comprises receiving a request from a requesting party to tear-up or assign a derivatives transaction, transmitting the request to tear-up or assign the derivatives transaction to a plurality of counterparts, wherein one of the plurality of counterparts is an original counterpart to the derivatives transaction, receiving pricing information from at least one of the plurality of counterparts, transmitting the pricing information to the requesting party, receiving an acceptance of the pricing information, tearing-up or assigning the derivatives transaction, as applicable, and notifying the original counterpart that the derivatives transaction has been torn-up or assigned.

In another embodiment of the present invention, a credit monitor module may be used in connection with the derivatives position tracking system. The credit monitor module is software that enables the trading engine to alert counterparts when a derivatives transaction exceeds a pre-defined credit limit. A method in accordance with this embodiment generally comprises: storing a credit limit received from a first counterpart relating to a second counterpart; monitoring trade requests from the second counterpart; and alerting the first counterpart when the trade request from the second counterpart would exceed the credit limit for the second counterpart. Additional features and advantages of the system are described further below.

DETAILED DESCRIPTION OF THE
EMBODIMENTS OF THE INVENTION

With reference to FIGS. 1-7, embodiments of the present invention will be shown and described. As noted above and in U.S. application Ser. No. 10/808,820 which published as U.S. Pub. No. 2004/0236668 on Nov. 25, 2004 and is commonly owned by the assignee of this application, the parties to a SWAP transaction can effect a trade via the telephone or an electronic trading system. In either case, the SWAP transaction information, or derivatives position, is populated on the derivatives interface automatically (if effected over the electronic trading system) or manually (if effected over the telephone or another electronic trading system). Generally, in a first embodiment, a derivatives trader can access a derivatives position interface, which displays one or more positions of the derivatives trader (see e.g., FIG. 2). From the derivatives position interface, the derivatives trader can initiate trading functionality to tear-up or assign a selected position. Functionality to roll a position may also be selected, as applicable. If the tear-up or assignment functionality is triggered, for example, a trade ticket interface is generated with the action initiated by the derivatives trader. The trade ticket interface is automatically populated with the original counterpart and information from the original derivatives trade. Updated pricing information, if applicable, will also populate the trade ticket interface. At this point, the derivatives trader may select to send the trade request only to the original counterpart or select additional counterparts to tear-up or assign the trade request.

Upon submission of the trade request to tear-up or assign a derivatives position, the selected counterparts are notified of the trade request through a counterparty trade ticket interface. The counterparty trade ticket interface will contain the details of the trade request and notice that the inquiry is a "tear-up" request as to the original counterpart or an "assignment" request as to any other counterpart. In response to the trade request, the counterparts submit competing prices via the counterparty trade ticket interface. The derivatives trader receives the counterpart prices and may make a selection to complete the unwind transaction. At this point, if the winning price was submitted by the original counterpart, then the counterpart receives a notification that the transaction has been "torn-up". In the alternative, if the winning price was submitted by any other counterpart, then the original counterpart is notified that the trade has been assigned away. A record of the tear-up/assignment trade is stored in a trade history database. For each derivatives trader, the derivatives position interface is updated to reflect all of its positions with counterparts reflective of any completed tear-ups/assignments. For each completed transaction (e.g., original SWAP transaction, tear-up, or assignment), the derivatives trader can transmit electronically the completed trade information from the derivatives position interface to either another interface on the electronic trading system or to a third-party electronic solution linked to the electronic trading system. The confirmation serves as a memorialization of the terms of the completed transaction, and is stored in electronic form on the electronic trading system or third-party electronic solution.

According to another aspect of the present invention, in a second embodiment, the derivatives position tracking system includes a credit monitor module. The credit monitor module permits counterparts to monitor its credit position vis-à-vis other counterparts. As discussed above, by way of background, it is typical for a counterpart (particularly, a dealer trading with multiple customers) to perform risk analysis and to monitor credit levels for its counterparts. Thus, for example, Dealer A may determine that Customer B only has sufficient credit to enter trades with it up to $200 million. If Customer B requests a trade that would put it over its limit, Dealer A would deny the trade request. Because the back-office operations to clear the trades can take several days, Dealer A may be unaware of its actual position with Customer A and may deny a trade with Customer A based on the belief that Customer A is over its credit limit or execute a trade with the belief that Customer A is still under its limit.

The credit monitor module permits the dealer to set a credit level for each of its customers. The credit monitor module accesses the derivatives trade database to retrieve the current credit exposure notional amount of derivative transactions for each of the dealer's customers. By summing all of the trades for a particular customer, the credit module can determine the total notional amount for a dealer's trades vis-à-vis a particular customer. Thus, each time a customer requests a trade, the credit module can determine whether the requested trade would put the customer over its credit limit with that dealer. When such a trade request is submitted, an alert is triggered to let the dealer know that executing the requested trade would put the customer over its credit limit. The alert, as will be discussed further, can take the form of a pop-up message interface, an audible sound, or both. Alternatively, the alert could be set to lock the trading functionality as to the particular trade request for that customer.

System Architecture

Figure 1:
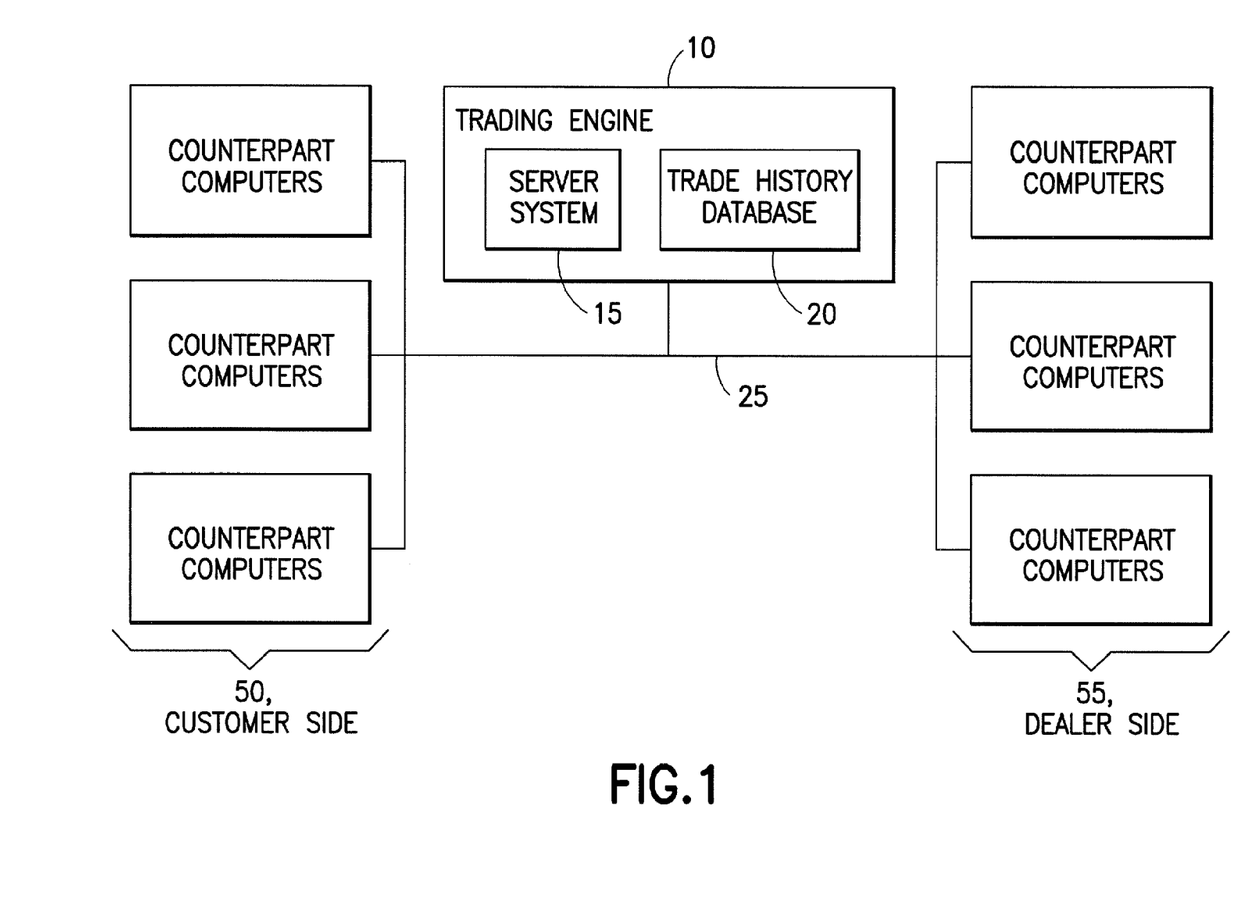
FIG. 1 is a schematic block diagram of the system architecture of a trading system in accordance with an embodiment of the present invention.

With reference to FIG. 1, an embodiment of a computer and network system for use with the present invention will now be described. A centralized trading engine 10 controls and executes the functionality required permit the trading activities described herein. The trading engine 10 generally comprises a server system 15, interconnected to a network 25 to enable communication with the counterparts' computer systems 50, 55 and a database system 20 for storing information related to trades executed by the engine 10 and other related information, including without limitation, the details of derivatives transactions and credit information. In the embodiment being described, the trading engine 10 interacts with dealer-side and customer-side software that controls the generation of the graphics user interfaces and controls various trading functions on dealer and customer computer systems 50, 55. An example of a trading engine and dealer- and customer-side software of the type being described was disclosed in U.S. patent application Ser. No. 10/808,820 dated Mar. 25, 2004 which published as U.S. Pub. No. 2004/0236668 on Nov. 25, 2004 the entire disclosure of which is incorporated herein by reference.

Customer and dealer computers 50, 55 are any type of personal or network computer such as an IBM-compatible computer running an Intel chipset and having an operating system, such as Microsoft Windows NT, 2000, XP, and the like, and, preferably, running a browser program such as Microsoft Internet Explorer or Netscape Navigator. It is also within the scope of the present invention that computers 50, 55 may be handheld or table computing devices, such as a personal digital assistant (PDA), pocket PC, and tablet PC, or the like. The computers 50, 55 also have access to a communications network via a modem or broadband connection to permit data communication between the dealer and customer and the trading engine 10.

Various input and output devices are preferably provided with the customer and dealer computers 50, 55 including, by way of non-limiting example, a display (e.g., cathode ray tube (CRT), liquid crystal display (LCD), etc.), and an input device (e.g., a keyboard, mouse, touch pad, or light pen). The customer and dealer computers 50, 55 would also preferably include a storage device such as, for example, a magnetic disk drive and magnetic disk, a CD-ROM drive and CD-ROM, DVD, or other equivalent device. The specific hardware combination/configuration is not crucial to the instant invention, and may vary as a matter of design choice within the functional parameters disclosed herein. Users of the trading engine 10 typically interact with the GUI's displayed by the software modules by "clicking" on numbers or graphics (e.g., buttons) that are displayed on the GUI's. Persons of skill will understand that the present invention is not limited to clicking with a computer mouse, but includes use of any other device for indicating an action with graphics-based software, such as a touch pad, light pen, touch sensitive display screen and the like.

The trading engine servers 15 may be computer servers of any type known in the industry, but capable of handling the flow of data on a substantially real-time basis. Moreover, persons of skill will recognize that multiple servers in a server farm arrangement may be utilized to handle the bandwidth and processing requirements of a particular arrangement of the present invention.

Trade history databases 20 comprise any mass storage devices capable of storing large amounts of data in an organized fashion, such as known data storage devices including, but not limited to hard disks, tape drivers, optical disks and the like.

Communication may be accomplished via electronic messaging using the Extensible Mark-up Language ("XML") or Financial Information Exchange ("FIX") format. In order for customer-side and dealer-side computers 50, 55 to communicate with the trading engine 10, an API is provided to enable users to establish connections to the trading engine 10, authenticate their systems, and exchange messages using, for example, the XML-based messaging protocol.

With respect to the exchange of messages between the customer-side, dealer-side, and trading engine 10, persons of skill in the art will recognize and understand the various message types being communicated across the system in light of the discussion of trade execution, allocation, confirmation, and settlement on the trading engine 10 in connection with the various screen shots and data flow diagrams. Persons of skill will also recognize that the particular structure of the messages and the preferred use of XML messaging is not necessary and alternate methods of messaging may be utilized.

Persons of skill in the art will further recognize that the exemplary system architecture shown and described herein may be modified in various manners so as to achieve the functionality set forth herein. Moreover, the particular layout or look and feel of the GUI's depicted in the FIGS. are meant only for illustration purposes and the scope of the present invention should not be so limited.

Operation of an Embodiment of the Derivatives Position Tracking System

With reference now to FIGS. 2-6, the operation of an illustrative embodiment of the derivatives position tracking system will be shown and described. It will be understood that the interfaces depicts in the FIGS. are meant only to illustrate the functionality described herein and could be modified or changed as a matter of design choice within the scope of the present invention.

Figure 2A:
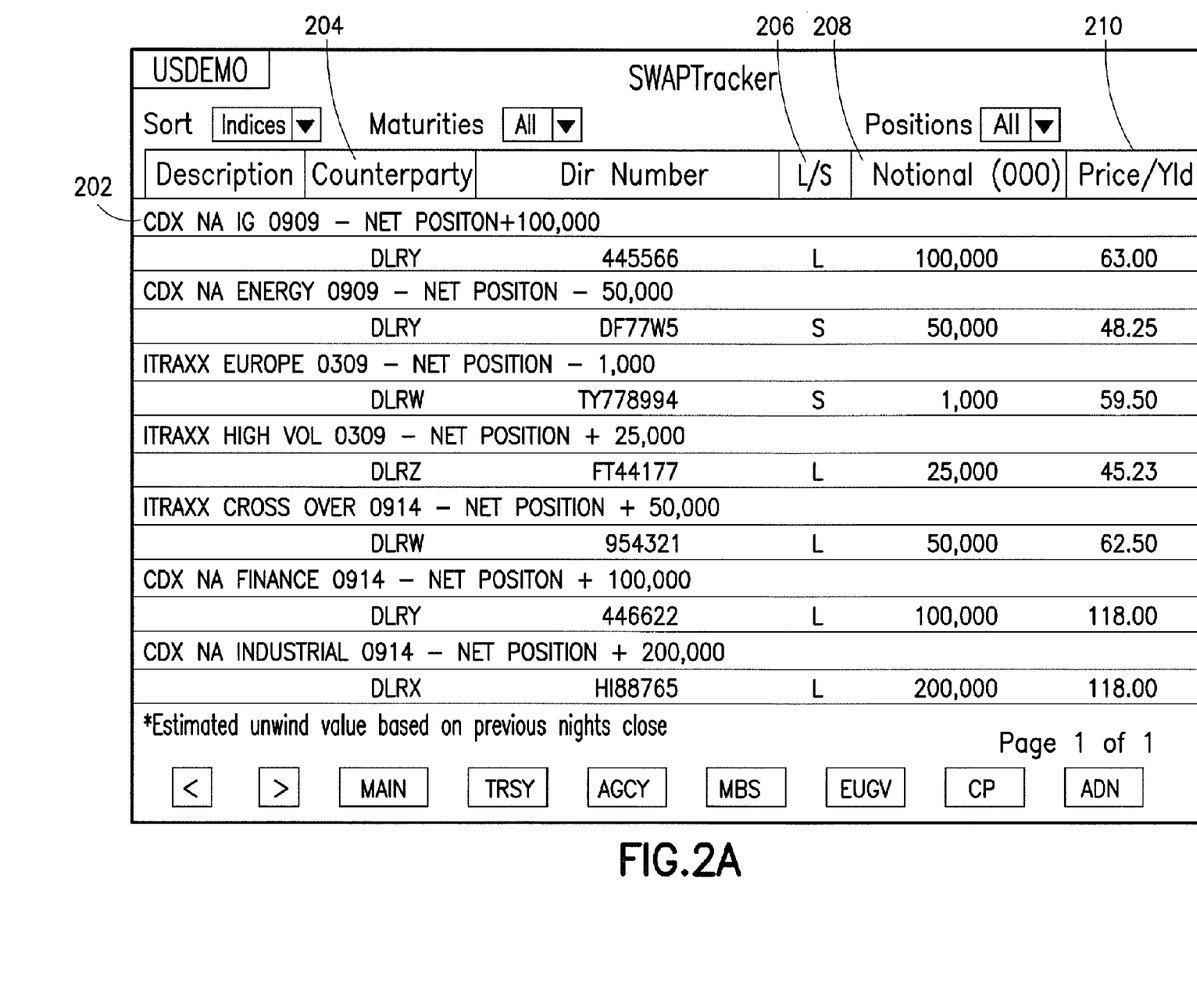
FIGS. 2A, 2B 3 and 4 are screen shots depicting illustrative graphical user interfaces of various features for use with the derivatives position tracking system.
Figure 2B:
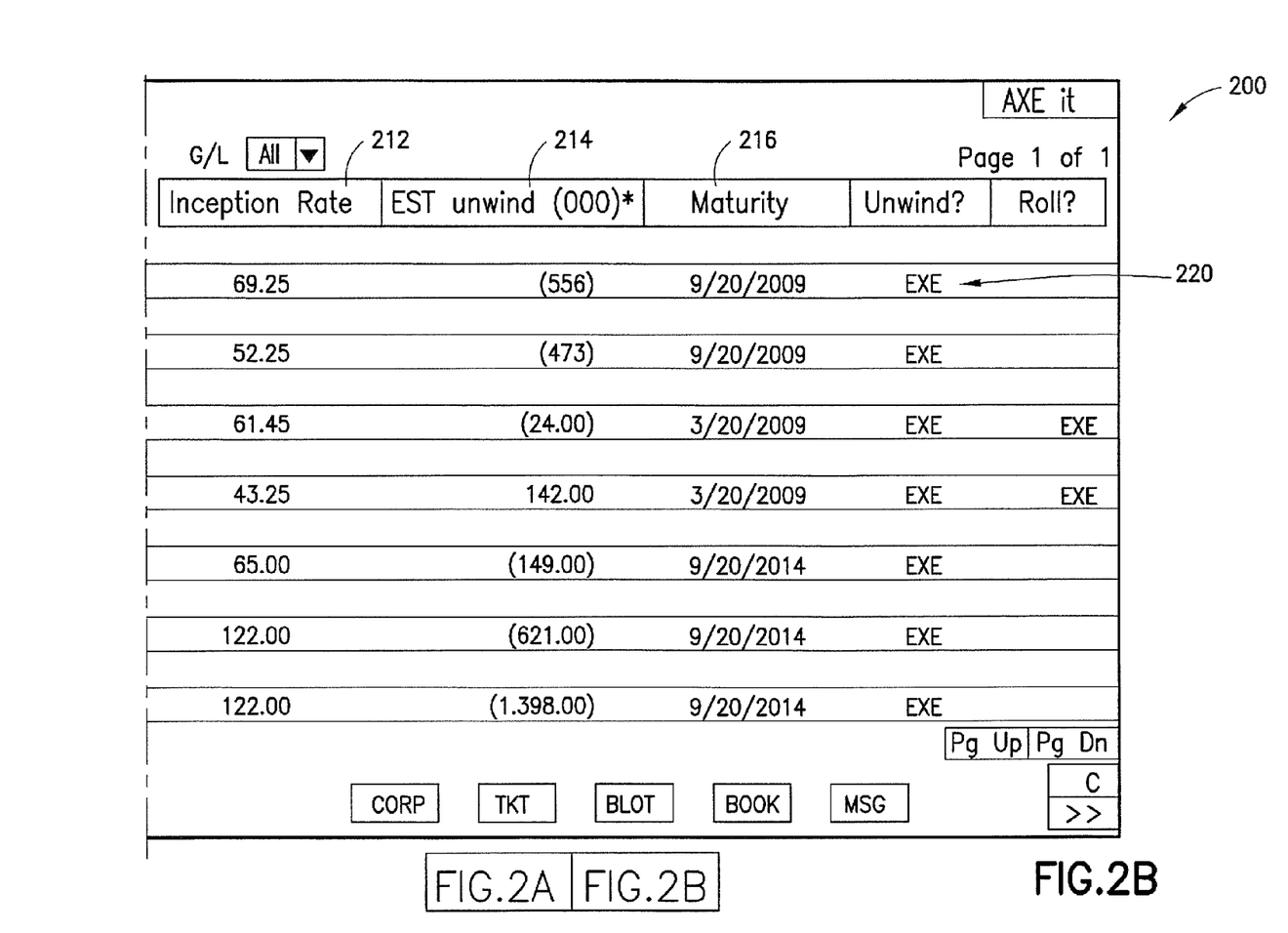

FIGS. 2A and 2B depict partial screenshots of a preferred graphical position-tracking interface 200 for displaying a counterpart's derivatives positions. FIG. 2A depicts the left side of graphical position-tracking interface 200 and FIG. 2B shows the right side of graphical position-tracking interface 200 as indicated by the legend at the bottom of FIG. 2B. The position-tracking graphical interface 200 is generated through access of the trade history database 20. As shown in FIGS. 2A and 2B, the position-tracking interface 200 displays various fields relating to the derivatives at issue. In the example being shown, the derivatives are credit default swaps, although persons of skill will recognize that the interface can be tailored to display relevant information for other types of derivatives or swaps transactions. The fields include, but are not limited to, a description of the derivative 202, Counterpart name 204, indication of long or short 206, notional amount 208, price or yield 210, inception rate 212, estimated unwind value 214, and maturity date 216.

Figure 3:
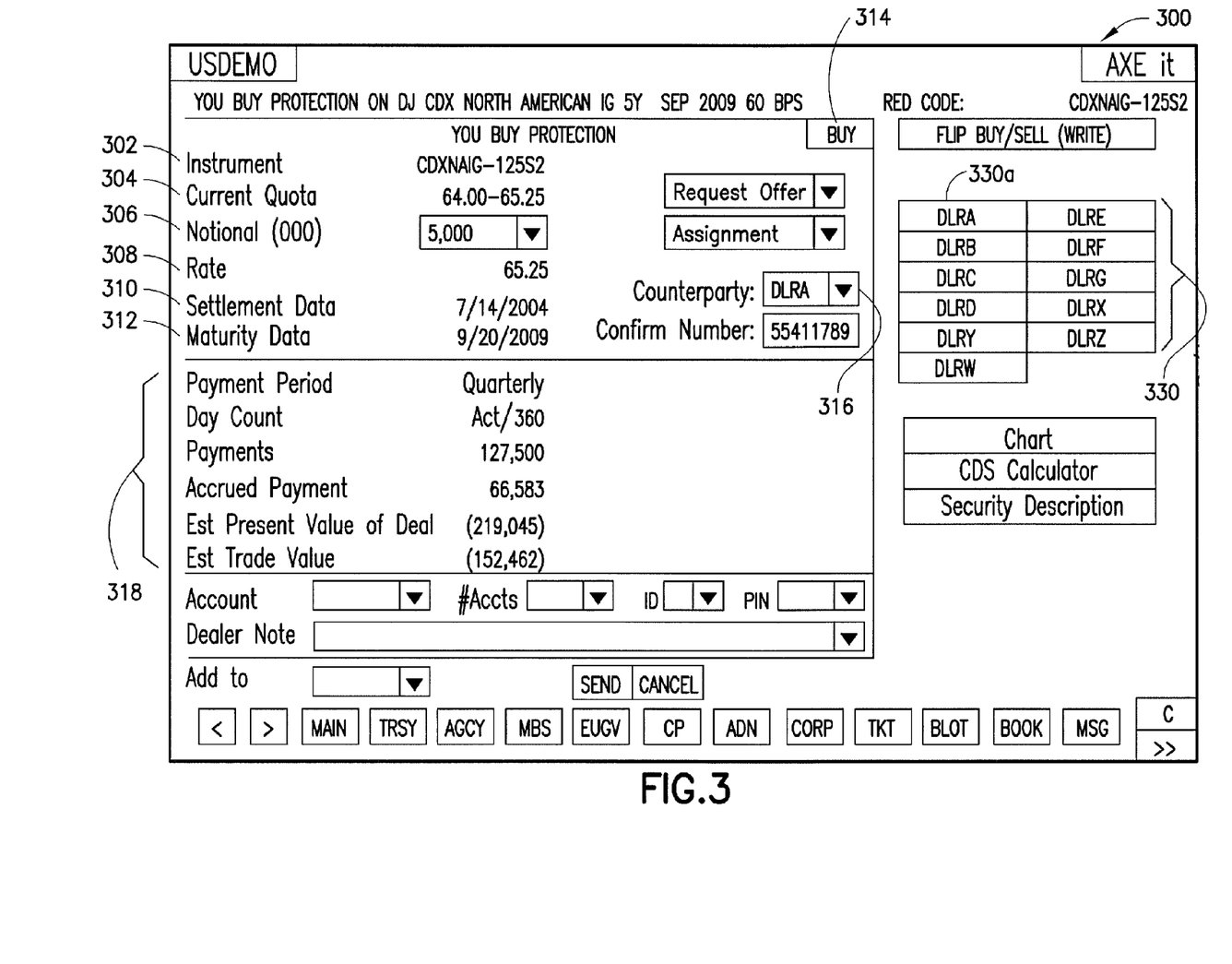
Figure 5:
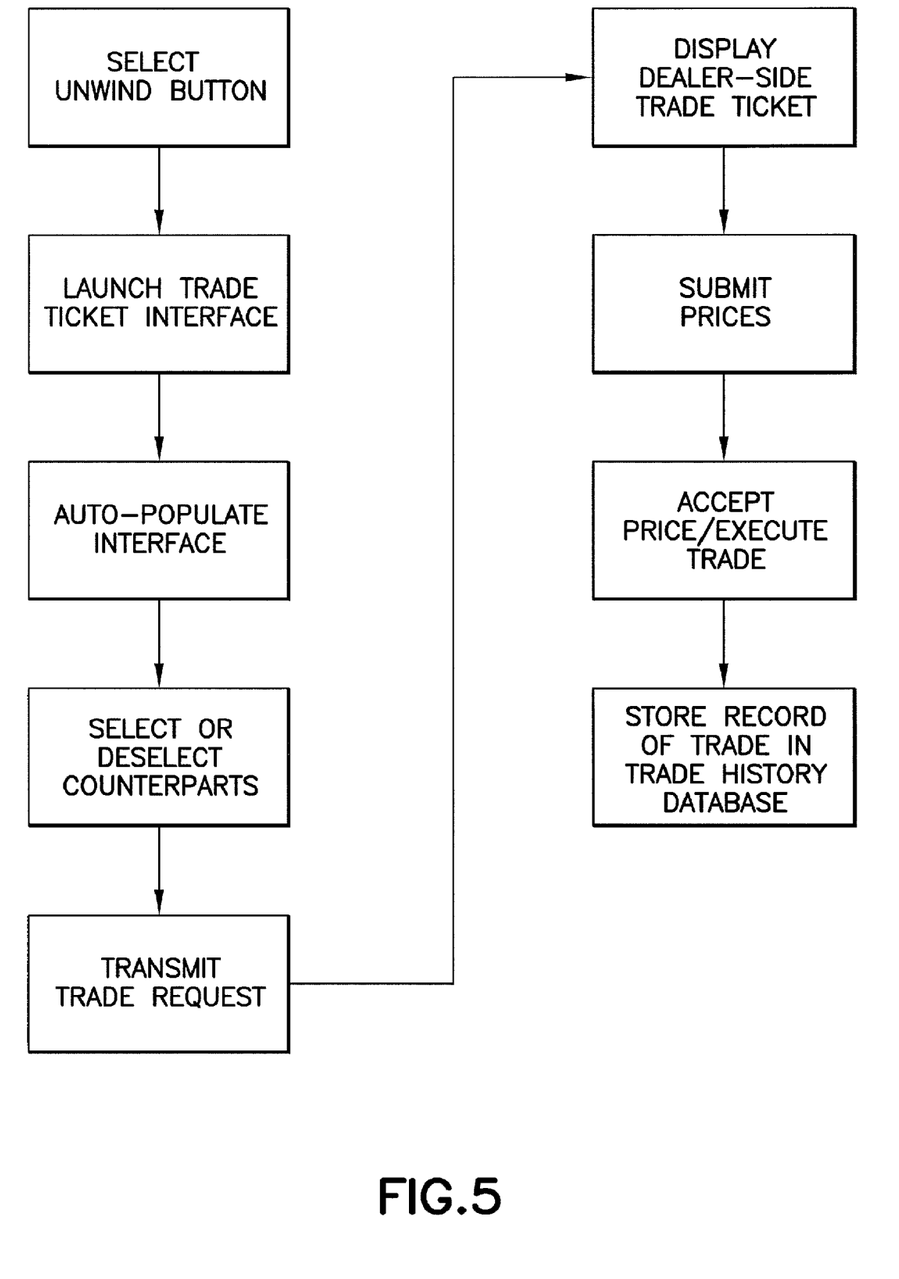
FIG. 5 is an illustrative process flow for monitoring unwinding a derivatives transaction.

With further reference to FIG. 5, a preferred process of unwinding a derivatives transaction using the position-tracking interface 200 will be described. In step 505, from the position-tracking interface 200, the counterpart can select to tear-up or assign a derivatives transaction by clicking or otherwise selecting the "unwind" button 220. In step 510, the selection of the unwind button 220 triggers the launch of a trade ticket interface 300. The trade ticket interface 300, as shown in FIG. 3, is automatically populated with information relevant to the unwinding or assigning of the selected derivatives transaction, in step 515. For example, the preferred trade ticket interface 300 shown in FIG. 3 displays information including, but not limited to, instrument type 302, current quote 304, notional amount 306, rate 308, settlement date 310, maturity date 312, nature of transaction (buy or sell) 314, counterparty 316, and related instrument specific information 318.

As can be seen on the trade ticket interface 300 of FIG. 3, the original counterpart (e.g., a dealer) to the derivatives transaction is pre-selected—in this example the button 330*a* for "DLRA". The customer has the option of selecting one or more additional counterparts to which to send the trade request. In the preferred trade ticket interface 300, the available counterpart names are displayed on buttons 330. When the buttons 330 are selected, the counterpart name is highlighted in a different color (represented by different grayscale in FIG. 3) to indicate the selection. In step 520, the counterpart reviews the auto-filled trade information and selects or deselects counterparts to transmit the tear-up/assignment request to as desired.

Figure 4:
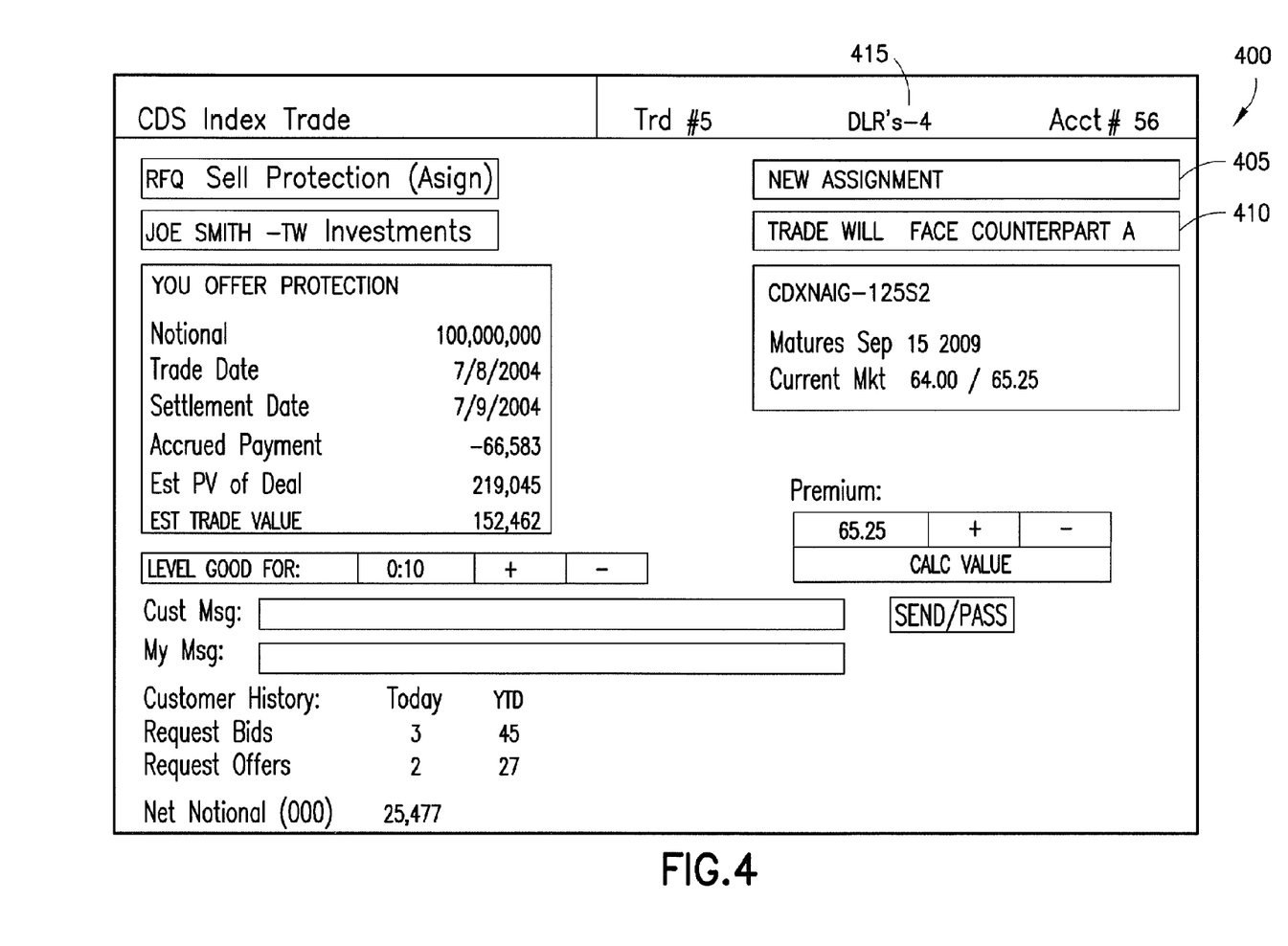

When the customer has completed filling out information on the trade ticket interface 300, in step 525, the customer can transmit the trade request through the trading engine 10 to the selected dealers. In step 530, upon receipt of the trade request, a dealer-side trade ticket interface 400 is displayed. A preferred dealer-side trade ticket interface 400 is shown in FIG. 4. The trade ticket interface 400 preferably includes an indication 405 as to whether the trade request is a tear-up or assignment and an indication 410 if the request is for an assignment who the original party to the trade was. By way of example, the indication 405 shown in FIG. 4 advises the dealers that they are bidding against the original dealer to the derivatives transaction. An indication 415 also lets the original dealer know that the customer has submitted the request to other dealers. At this point, in step 535, the selected dealers can submit their prices to the customer through the trading engine 10. Upon receipt, the customer may accept one of the dealers' prices to thereby execute a trade to tear-up or assign the derivatives position in step 540.

Upon execution, in step 545, a record of the trade to tear-up or assign the position is stored in the trade history database 20. The original party to the derivatives transaction will receive a notification that the derivatives transaction was torn-up or assigned whether or not that original party was selected by the customer. The tear-up or assignment, as applicable, will also be reflected in the selected dealer's position tracking interface. Therefore, if the customer's trade request results in an assignment, the original party dealer will be made aware that its position vis-à-vis the customer is flat in real-time. This enables the dealer and the customer to execute a subsequent trade in a time frame that would not previously be practical.

Figure 6:
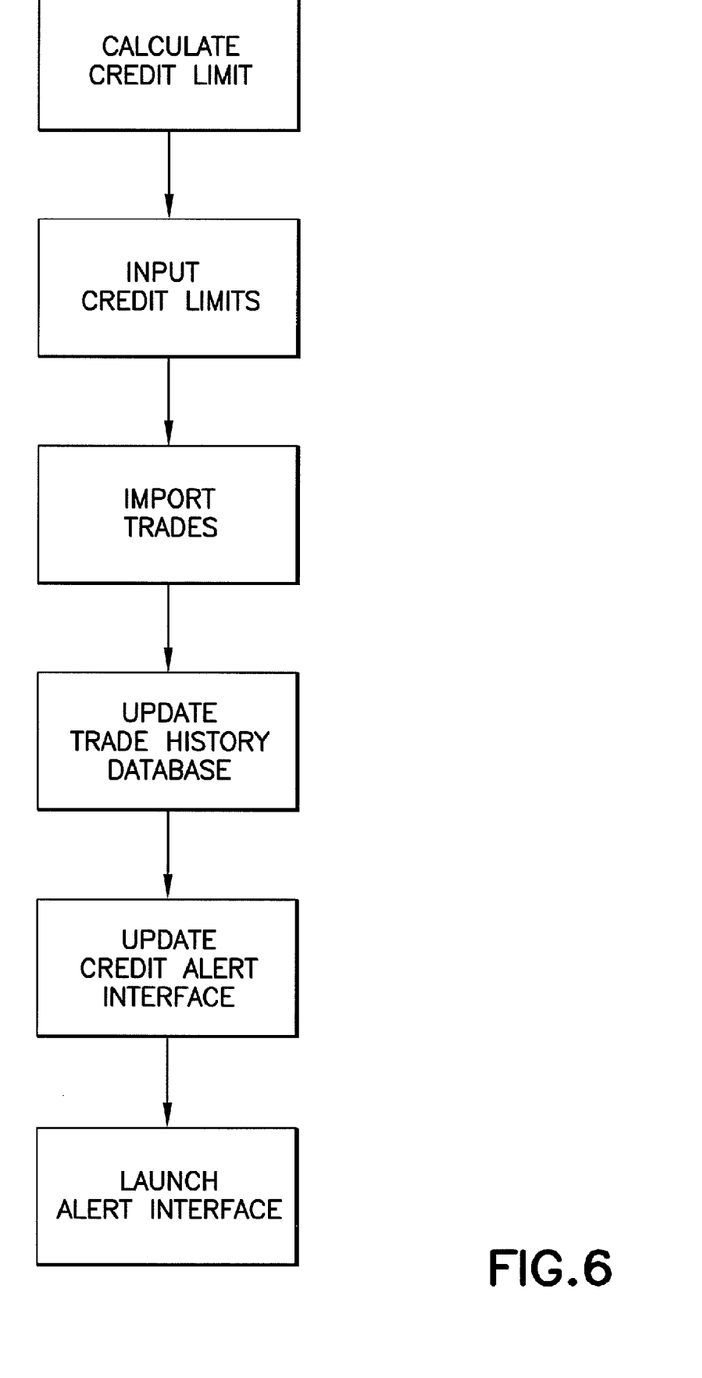
FIG. 6 is an illustrative process flow for monitoring the credit of a counterpart.
Figure 7:
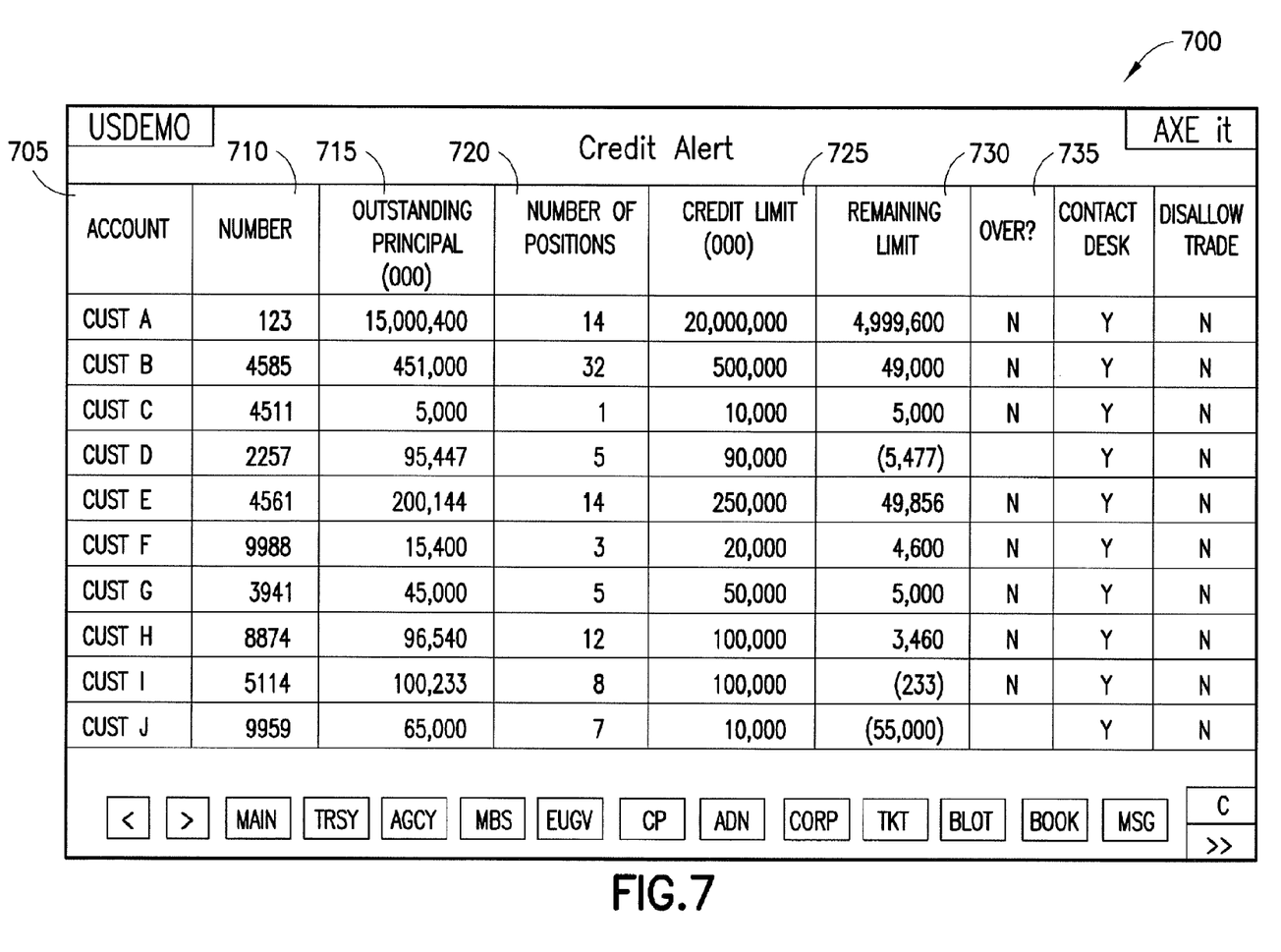
FIG. 7 is a screen shot depicting an illustrative graphical user interface of various features for use with the credit monitor module.

With reference now to FIGS. 6 and 7, there is shown an illustrative process flow for monitoring the credit position of a plurality of counterparts and initiating an alert in the event one or more of the counterparts has taken or attempts to take a position above its credit limit. FIG. 7 depicts an illustrative credit monitor interface 700 that displays various information, as described below, relating to the credit position of one or more counterparts. As shown in FIG. 7, The credit monitor interface 700 preferably includes the following fields: an account name field 705, an account number field 710, an outstanding principal amount field 715, a position number field 720, a credit limit field 725, a remaining limit field 730, a over the limit field 735, and other information pertaining to the current position of a counterpart. With reference now to FIG. 6, in step 605, a company that trades with one or more counterparts (in this example referred to as a customer) calculates a credit limit for each of the customers. The credit limit may be calculated using any risk management or credit calculation known in the financial industry. In step 610, the company can input the calculated credit limits for each of the customers. Once a credit account is set-up in the credit monitoring system, in step 615, the credit monitor module imports all of the trades for each of the customers for which an account has been set up in to the credit monitoring system. These trades are preferably imported from the trade history database 20 using the account number or account name, for example. Like the position tracking interface, trades performed outside the trading engine 10, such as via telephone or other electronic system can also be manually input to the credit monitoring system. In this way, the credit alert interface 700 of FIG. 7 can be populated to show the overall or outstanding principal amount of a customer's trades with the subject company. Of course, persons of skill in the art will recognize that the information displayed in the credit alert interface can include any information pertaining to the trades executed between the counterparts and not just the information that is shown in the illustrative interface of FIG. 7. As trades are executed, the information is stored in the trade history database 20, in step 620, and the credit alert interface is correspondingly updated in step 625. In this way, the credit monitor module can monitor the position of a customer in real-time. The credit alert interface thus permits traders at a company to quickly and easily view the relative positions and the remaining credit limit of its customers. In step 630, the company will be alerted when a trade request from a customer is received that would cause the customer to exceed its credit limit. The alert can be given in any number of ways, including but not limited to a pop up message, an audible tone, an electronic message sent to a specific electronic mail account, and the like. By checking the credit alert interface 700, traders at the subject company will quickly be able to tell which of the counterparts is over the limit and by how much.

Thus, while there have been shown and described fundamental novel features of the invention as applied to the exemplary embodiments thereof, it will be understood that omissions and substitutions and changes in the form and details of the disclosed invention may be made by those skilled in the art without departing from the spirit of the invention.

I claim:

1. A system for monitoring derivatives transactions, the system comprising:
 a trading engine computer system configured to communicate with a plurality of counterpart computers, the trading engine computer system including one or more computers, the one or more computers including a storage medium and one or more processors, and wherein computer programming is stored on the storage medium and operative on the processors to enable the monitoring and execution of the derivatives transactions;
 a centralized trade history database system including one or more mass storage devices and communicatively connected to the trading engine computer system and configured to communicate with the plurality of counterpart computers, the centralized trade history database system configured to store a set of records of at least a portion of the derivatives transactions executed on the trading engine computer system for later retrieval by the plurality of counterpart computers; and
 wherein the trading engine computer system is configured to monitor an unwinding of a single derivatives transaction by initiating a record of the unwinding to be stored in the centralized trade history database system, and sending a notification of the unwinding of the derivatives transaction and update a credit position of at least one party based upon data stored in the centralized trade history database.

2. The system of claim 1, wherein the unwinding of the derivatives transaction is a tear-up.

3. The system of claim 1, wherein the unwinding of the derivatives transaction is an assignment.

4. The system of claim 1, wherein the centralized trade history database system is also configured to store a record of at least a portion of a derivatives transaction executed on a second trading engine.

5. The system of claim 1, the centralized trade history database system is also configured to store a record of derivatives transactions executed over the telephone.

6. The system of claim 1, wherein the one or more computers are servers.

7. The system of claim 1, wherein at least one of the counterpart computers is a personal digital assistant.

8. The system of claim 1, wherein the centralized trade history database system resides on a data storage device.

9. The system of claim 8, wherein the data storage device is a hard disk drive system.

10. The system of claim 1, wherein the trading engine and counterpart computers communicate through the exchange of data messages.

11. The system of claim 10, wherein the data messages use an extensible markup language format.

12. The system of claim 1, wherein the counterpart computers are configured to provide a set of graphical user interfaces that enable control of a plurality of trading-related functions.

13. The system of claim 12, wherein information entered into the counterpart computers through the set of graphical user interfaces is transmitted to the trading engine for processing.

14. The system of claim 12, wherein the graphical user interfaces include a position-tracking interface comprising at least a set of derivatives positions for one of the counterparts.

15. The system of claim 14, wherein the position tracking interface includes a field for a description of a derivatives position from the set of derivatives positions.

16. The system of claim 12, wherein the graphical user interfaces include a trade ticket interface for use in unwinding the derivatives transaction.

17. A non-transitory computer usable medium storing computer readable program code adapted to be executed by a computer to monitor derivatives transactions, the computer readable program code comprising:
a trading engine component including computer program code configured to cause a computer to receive information transmitted from a first and second counterparty computer and execute a derivatives transaction based on the information received from the first and second counterparty computers;
a trade history component including computer program code configured to cause a computer to store in a centralized trade history database on a storage medium a set of records of at least a portion of the derivatives transactions executed by the trading engine component; and
a credit monitoring module including computer program code executable to cause a computer to monitor an unwinding of the derivatives transactions by initiating a record of the unwinding to be stored in the centralized trade history database, transmit a notification of the unwinding of the derivatives transaction monitor and update a credit position of at least one party to a derivatives transaction to reflect the derivatives transaction based upon data stored in the centralized trade history database and compare the updated credit position with a set credit level.

18. The computer usable medium of claim 17, wherein the first and second counterparty computers include computer program code configured to provide a set of graphical user interfaces that enable control of a plurality of trading-related functions.

19. The computer usable medium of claim 17, wherein the unwinding of the derivatives transaction is a tear-up.

20. The computer usable medium of claim 17, wherein the unwinding of the derivatives transaction is an assignment.

* * * * *